United States Patent [19]
Noack et al.

[11] 3,733,990
[45] May 22, 1973

[54] PHOTOGRAPHIC FOCAL-PLANE SHUTTER

[75] Inventors: Rolf Noack, Dresden; Karl Kromer, Radebeul; Paul Hillman, Dresden, all of Germany

[73] Assignee: Veb Pentacon Dresden Kamera-und Kinowerke, Dresden, Germany

[22] Filed: July 19, 1971

[21] Appl. No.: 163,958

[30] Foreign Application Priority Data

Jan. 21, 1971 Germany............WP 57 a/152 632

[52] U.S. Cl....................................................95/55
[51] Int. Cl................................................G03b 9/36
[58] Field of Search......................................95/55, 56

[56] References Cited

UNITED STATES PATENTS 3,628,434  12/1971  Leitz et al..................................95/55

FOREIGN PATENTS OR APPLICATIONS 1,351,718  12/1963  France ......................................95/55
1,145,474  3/1963   Germany..................................95/55

Primary Examiner—Richard L. Moses
Attorney—William A. Drucker

[57] ABSTRACT

The photographic focal-plane shutter has a base plate with an exposure aperture and is provided with a group of opening blades and a group of closing shutter blades. The blades are movable in planes lying parallel with the base plate. The opening shutter blade group is operated by levers which are pivoted in scissors fashion. The base plate is provided with guide skids extending from the base plate of which the opening and closing blades are guided. First and second additional skids extending from the base plate serve to guide a respective one of the levers. The skids and additional skids are of different height to effect spacing of the blades and levers from one another.

2 Claims, 1 Drawing Figure

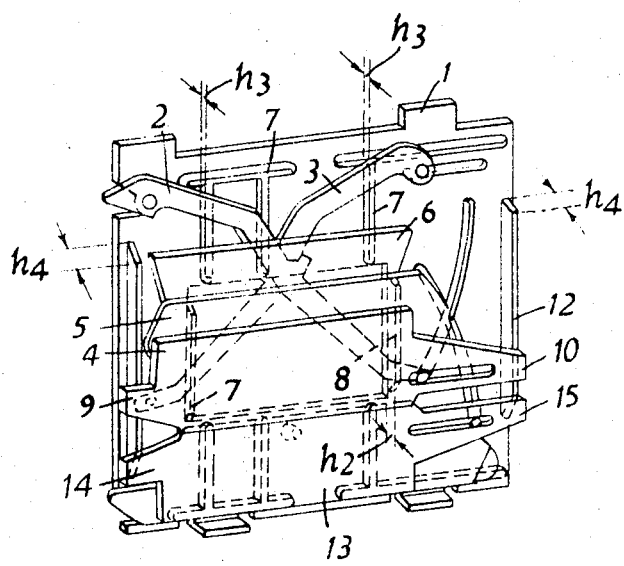

PHOTOGRAPHIC FOCAL-PLANE SHUTTER

BACKGROUND TO THE INVENTION

The invention relates to a photographic focal-plane shutter having a group of opening blades and a group of closing blades which are movable in planes lying parallel with a base plate, by operating levers which are pivotable in scissors fashion.

In known shutters of this kind the opening and closing blades are movably arranged in the space between base plate and film trap. In order to achieve exact flat guidance in relation to the base plate and the film trap it is known to guide each of the opening and closing blades on both sides of the picture window in plain or roller bearings. This construction increases the masses to be moved in the opening and closing operations, which makes the achievement of short opening and closing times more difficult.

The invention has the purpose of achieving high opening and closing speeds of the shutter blades and has for its problem a flat guidance which does not increase the mass of the opening and closing blades.

SUMMARY OF THE INVENTION

According to the invention in a photographic focal plane shutter having a base plate with an exposure aperture, a group of opening and a group of closing blades moveable one over the other in planes parallel with the base plate, and first and second operating levers which are pivotable in scissor fashion to effect movement of the opening blades, there is provided guide skids extending from the base plate on opposite sides of the exposure aperture on which one of the blades of each group is slidable and first and second additional guide skids extending from the base plate on which said first and second levers respectively are slidable wherein the guide skids and additional guide skids are of different height whereby spacing of the blades and levers from one another is effected.

BRIEF DESCRIPTION OF DRAWING

The invention is explained by an illustrated and described example of embodiment, in which for the sake of clarity only the drive mechanism for the group of opening blades is illustrated.

DESCRIPTION OF PREFERRED EMBODIMENT

On the base plate 1 the first operating lever 2 and the second operating lever 3 are mounted in scissors fashion. The free ends of these operating levers 2 and 3 are coupled with the first opening blade 4 which is connected with the further opening blades 5 and 6. On the base plate 1 there are also provided guide skids 7 on which the operating lever 3 slides and the height $h_3$ of which corresponds to the distance of the operating lever 3 from the base plate 1. The operating lever 2 arranged over the operating lever 3 has a greater distance from the base plate 1 and therefore slides on a guide skid 8 the height $h_2$ of which is dimensioned in accordance with this greater distance of the operating lever 2 from the base plate 1. The first opening blade 4 possesses lateral guide lugs 9 and 10 which slide directly on guide skids 11 and 12. The height $h_4$ of the guide skids 11 and 12 corresponds to the distance of the opening blade 4 from the base plate 1.

On movement of the opening blades 4, 5 and 6 the guide lugs 9 and 10 and the operating levers 2 and 3 slide on the guide skids 12, 8 and 7, so that a secure flat position of the opening blades is always ensured.

The group of closing blades, indicated by the first closing blade 13, corresponds in construction and flat guidance to the arrangement for the group of the opening blades. The lateral guide lugs 14 and 15 of the closing blade 13 likewise slide on the guide skids 11 and 12.

We claim:

1. In a photographic focal plane shutter having a base plate with an exposure aperture, a group of opening and a group of closing blades moveable one over the other in planes parallel with the base plate and first and second operating levers which are pivotable in scissor fashion to effect movement of the opening blades, the provision of guide skids extending from the base plate on opposite sides of the exposure aperture on which one of the blades of each group is slidable and first and second additional guide skids extending from the base plate on which said first and second levers respectively are slidable wherein the guide skids and additional guide skids are of different height whereby spacing of the blades and levers from one another is effected.

2. In a photographic focal plane shutter according to claim 1, the provision of lateral guide lugs on each side of said one of the blades of each group which lugs slide on the side of the guide skids.

* * * * *